Feb. 28, 1928.
W. S. DE CAMP
1,661,032
AUTOMATIC SLACK ADJUSTER FOR AIR BRAKES
Filed June 29, 1926
2 Sheets-Sheet 1
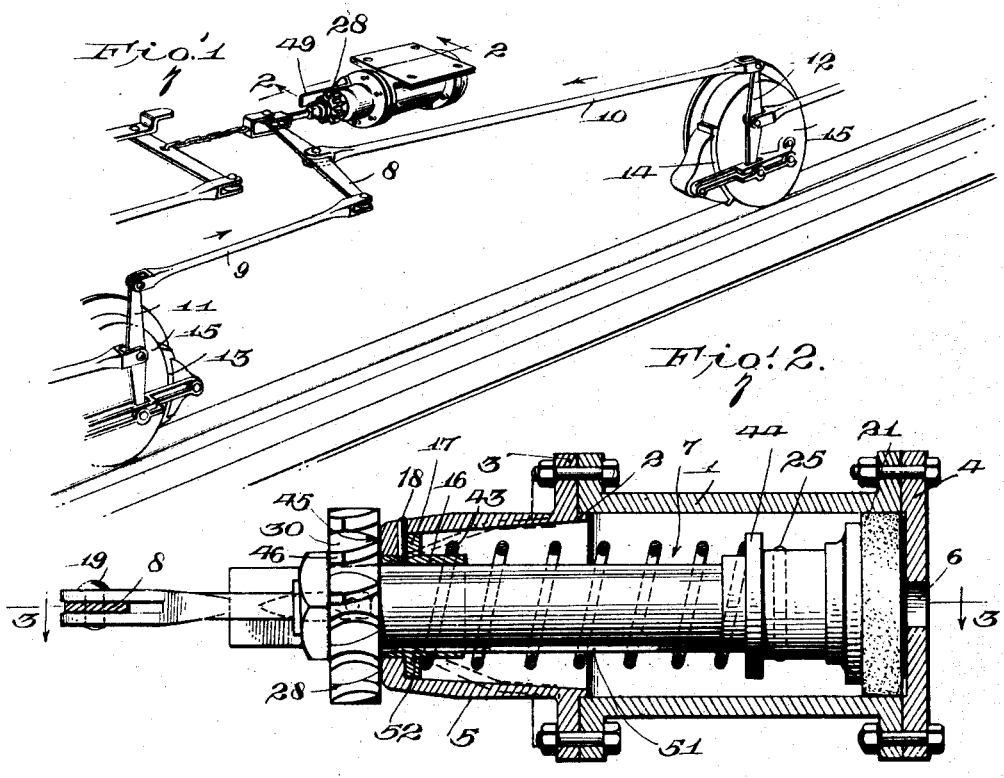
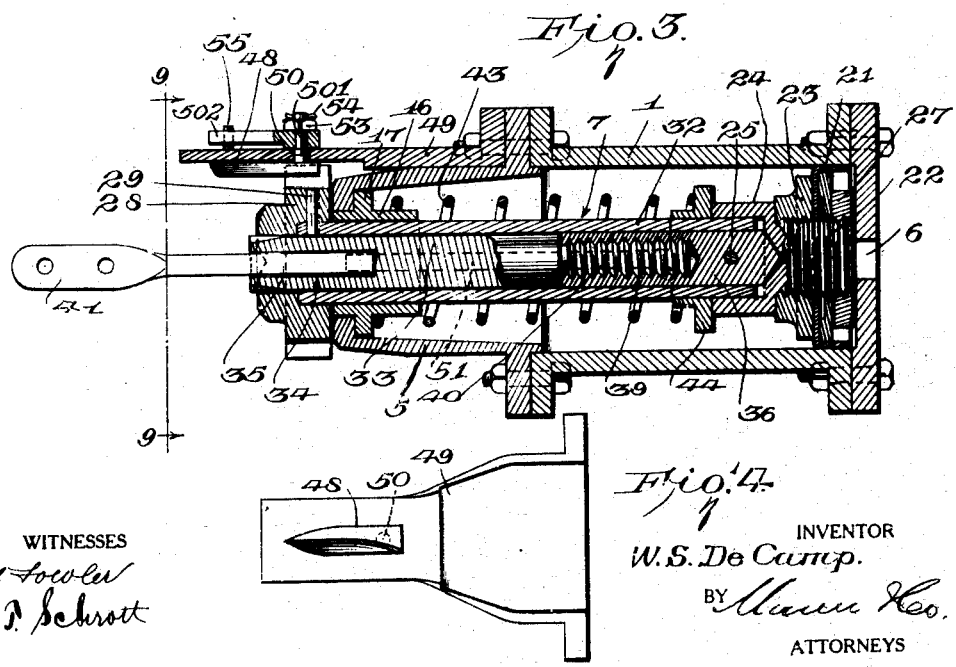
WITNESSES
INVENTOR
W. S. De Camp.
ATTORNEYS Feb. 28, 1928.
W. S. DE CAMP
1,661,032
AUTOMATIC SLACK ADJUSTER FOR AIR BRAKES
Filed June 29, 1926 2 Sheets-Sheet 2
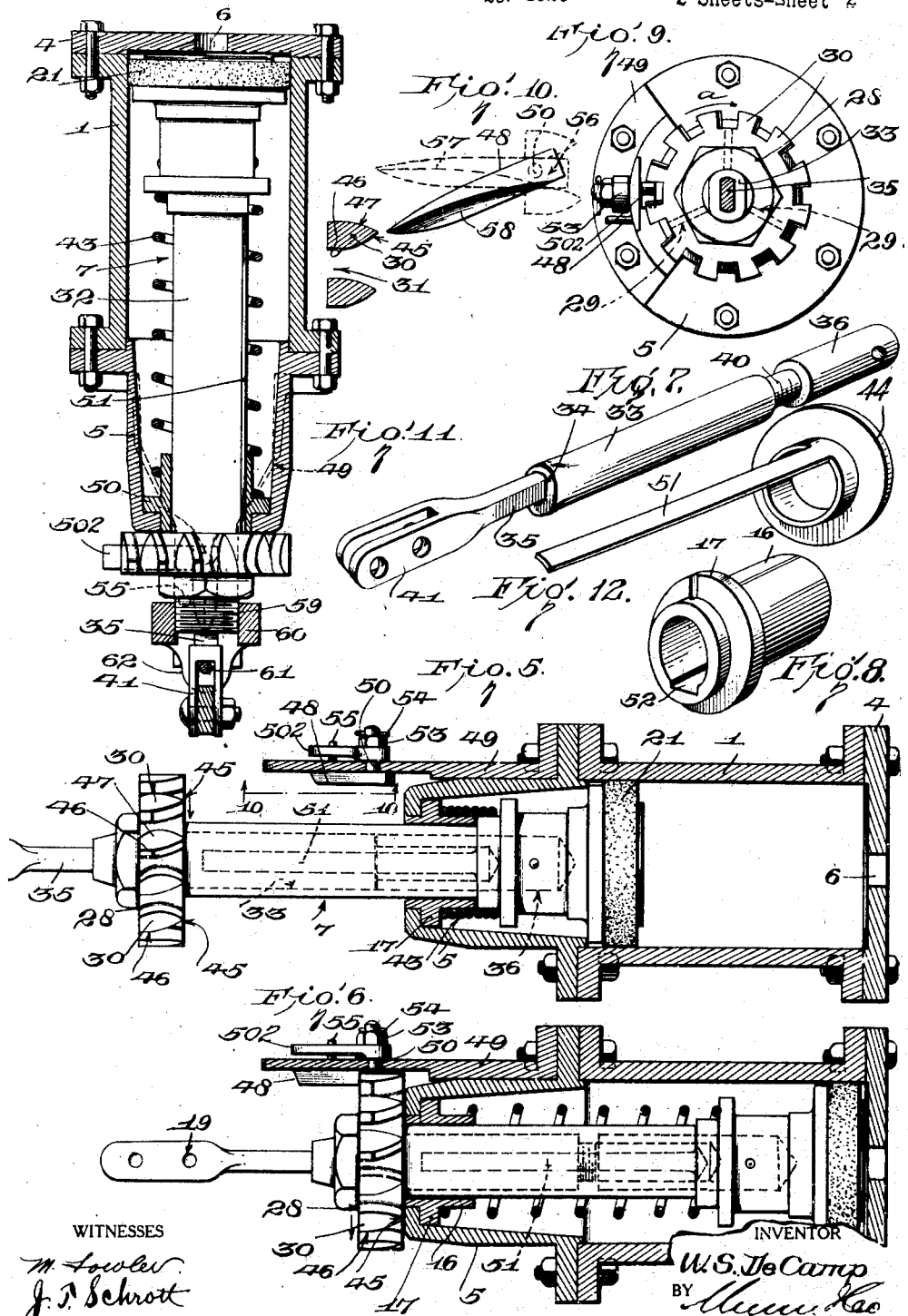

Patented Feb. 28, 1928.

1,661,032

UNITED STATES PATENT OFFICE.

WILLIAM S. DE CAMP, OF CHILLICOTHE, OHIO.

AUTOMATIC SLACK ADJUSTER FOR AIR BRAKES.

Application filed June 29, 1926. Serial No. 119,407.

This invention relates to improvements in slack adjusters, particularly for air brakes, and it consists of the constructions, combinations and arrangements herein described and claimed.

An object of the invention is to provide a device for automatically making adjustments in the brake connection when needed in order to take up any slack in the brake shoes brought about by the wear thereon incidental to repeated application, one of the outstanding features being the provision for a full application stroke of the piston as distinguished from but partial application strokes in other constructions, and the performance of the adjustment for eliminating the foregoing slack on the release stroke of the piston.

Other objects and advantages appear in the following specification, reference being had to the accompanying drawings, in which Figure 1 is a diagrammatic perspective view of enough of an air brake system for reference in connection with the slack adjuster.

Figure 2 is a longitudinal section of the brake cylinder taken substantially on the line 2—2 of Figure 1, the piston being shown in the brake-shoe releasing position.

Figure 3 is a longitudinal section taken on the line 3—3 of Figure 2.

Figure 4 is a detail elevation of the pawl and bracket hereinafter referred to.

Figure 5 is a sectional diagram showing the position of the piston at the end of the full application stroke, the positions of the associated parts indicating that the brake shoes are comparatively new.

Figure 6 is a similar diagram, the position of parts indicating that the brake shoes have begun to wear, the piston being in the release position.

Figure 7 is a detail perspective view of the automatically extensible core.

Figure 8 is a detail perspective view of the improved bushing against which one end of the spring rests.

Figure 9 is a cross section taken on the line 9—9 of Figure 3.

Figure 10 is a section taken substantially on the line 10—10 of Figure 5, the view being of diagrammatic order to illustrate the action of the pawls as later described.

Figure 11 is a sectional view of the brake cylinder as applied in the vertical position for use on locomotives.

Figure 12 is a detail perspective view of the washer and key hereinafter referred to.

This invention is an improvement on the slack adjuster for air brakes disclosed in my co-pending application filed October 30, 1925, Serial #65,817, reference also being had to my Patent 1,560,980 of November 10, 1925, for automatic slack adjusters.

As brought out in the foregoing application and patent the purpose of the slack adjuster, as the name implies, is to make such adjustments in the connections of the brake system from time to time as will keep the brake shoes in such positions relative to the treads of the shoes as will permit a proper application of the shoes for the braking action. Such adjustments are made from time to time as needed, and the action is automatic. In each of the foregoing cases the adjustment for taking up slack occurred on the application stroke of the piston, in other words on that stroke during which the brakes were applied, but according to the present invention any necessary adjustment is made on the return or release stroke of the piston. In addition to bringing about the advantage of having the parts ready for an ensuing application stroke by virtue of the foregoing arrangement, there is the additional advantage of permitting a full stroke of the piston within the brake cylinder at certain times, this being of particular advantage in case the brake shoes should break or come off.

Some of the elements of the present construction are disclosed in each of the foregoing cases, and prior to disclosing the present invention these elements are described in order that a general understanding may be had. 1 designates a brake cylinder which has heads 3 and 4 respectively known as the non-pressure and pressure heads by virtue of the fact that the latter is subjected to internal air pressure and the former is not. The first head includes a tubular extension 5, and also an annular shoulder 2 upon which the cylinder 1 fits, the shoulder serving to centralize one part in respect to the other. The head 4 has an opening 6 which may be regarded as communicating with a triple valve mechanism (not shown) by the action of which air under compression is admitted to the cylinder 1.

7 designates a plunger which operates in the cylinder 1 and the tubular extension 5 thereof, the operation of the plunger causing rocking of the cylinder lever 8 (Fig. 1) so that power is applied to the pull rods 9 and 10 in the direction of the arrows for the purpose of applying the brakes. The extremities of the pull rods have connection with brake levers 11 and 12 which in turn act upon the brake shoes 13 and 14, moving them against the treads or bases of the wheels 15 in order to perform the braking action as stated.

The foregoing structure is to be found on passenger, freight and street cars as well as on locomotives, but for the latter purpose the cylinder is held erect as in Figure 11 rather than horizontal for the other purposes.

A piston 21 situated in the cylinder 1 moves to the left when compressed air is admitted to perform what is known as the application stroke. The piston is secured to the plunger by suitable means, the pin 25 being preferable because it must also pass through the sleeve 32 and inner section 36 of the plunger so that all these things are secured together and may move as one. The section 36 has a threaded bore 39. The piston includes a short threaded stem 22 upon which the portion 23 is screwed until it engages the shoulder of the portion 24 on which the threaded stem is formed. The usual cup leather and washer of the piston are held in place by a nut 27.

A bushing 16 guides the plunger 7. This bushing has a circular flange 17 abutting the circular shoulder 18 formed within the extremity of the tubular extension 5. The bushing is held in place by one or more pins 18 (Fig. 2).

A spring 43 rests against the circular flange 17 at one end, and at the other end rests against a washer 44 which is loosely fitted upon the sleeve 32 of the plunger 7. The purpose of the spring is to return the piston after an application stroke, it being upon the release stroke thus performed by the spring that the adjustments for taking up slack are made. The washer 44 has a long narrow extension or key 51 which fits in the groove 52 in the bushing 16 (Figs. 2 and 8). Inasmuch as the bushing 16 is fixed, rotation of neither the washer 44 nor the spring 43 can take place upon the foregoing release stroke of the piston, and the likelihood of a counter rotation of the piston 21 (which is undesirable) is therefore obviated.

The plunger 7 includes an outer core section 33 which has a threaded stem 40 screwing into the bore 39. The section 33 has a non-circular bore 34, in this case oval, receiving the correspondingly shaped rod 35 to the bifurcated head 41 of which the cylinder lever 8 is pivoted at 19.

The improvement comprises a ratchet 28 which is firmly secured upon that end of the plunger sleeve 32 protruding from the tubular extension 5. In order that the mounting of the ratchet upon the plunger may be very secure use is made of a plurality of pins 29, these being evenly distributed. Although the use of pins is specified, the ratchet 28 may obviously be secured to the plunger by other desired means. The periphery of the ratchet is formed into a plurality of teeth generally indicated 30, the spaces between the teeth being indicated 31 (Figure 10). These teeth are specially shaped, and as particularly shown in Figure 10 have inclined surfaces 45 merging with axially parallel surfaces 46. The surfaces 45 and 46 occur on one side of each tooth, the opposite side being arbitrarily rounded as at 47. The surfaces 47 play no part in turning the ratchet although they must be shaped in such manner that the pawl may be passed over without hinderance of any sort.

The pawl is pivotally mounted upon a bracket 49, which in the present instance is made as a separate element so that it may be applied to existing types of air brake cylinders.

A stub shaft 50 on the pawl provides the pivotal mounting thereof upon the bracket (Fig. 3). The stub shaft is made non-circular as at 501 to receive and hold the weight arm 502 without turning in respect to the stub shaft. A nut 53 screwed upon the threaded extremity of the stub shaft holds the weight arm in place, and a cotter pin 54 keeps the nut from coming off. The pawl 48 gravitates to the inclined position shown in full lines in Figure 10 when the ratchet 28 is moved beyond the extremity of the pawl upon an application stroke of the piston, whereupon the weight arm 502 rests upon a pin 55 which acts as a stop, limiting the downward movement of the pawl.

The heel 56 is preferably squared, but regardless of the shape of the end of the heel the upper and lower edges of the pawl are square with the ratchet so that riding of the surface 46 of a tooth upon the upper edge of the pawl will have the result of bringing the pawl up to the horizontal position as dotted in Figure 10. The extremity of the pawl opposite to the pivot 50 is shaped into a point 57 by double beveling or rounding the upper and lower edges. The lower front edge is shaped at 58 by a sort of combination beveling and rounding to insure avoidance of any friction or binding between the pawl and the ratchet tooth 30 next lowest upon the return or release stroke of the piston.

The operation is readily understood. The reader is first asked to assume that each of the brake shoes 13 and 14 (Fig. 1) is new. The brake shoes are applied to the wheels 15 by admitting fluid under pressure at the opening 6 to the cylinder 1 so that the piston 21 is moved to the left, but inasmuch as the brake shoes are new, as stated, it obviously will not take a full stroke of the piston within the cylinder 1 to apply the brakes.

But in time the brake shoes 13 and 14 will wear, so that each succeeding application stroke of the piston 21 will be represented by an increasing length of stroke of the piston within the cylinder. All of these strokes are for purposes of illustration supposed to be within range of the pawl 48, in other words, as yet the ratchet 38 has not passed beyond the point of the pawl. Ultimately the wear on the brake shoes will be to such extent that the ratchet 28 will pass beyond the point of the pawl.

When this takes place the pawl 48 will drop to the inclined position shown in Figure 10, this being due to the action of the weight arm 502 on the other side of the bracket 49. The point 57 will then come within range of the point of a tooth 30 next lowest. Completion of the application stroke will be followed by the release of pressure against the piston 21 so that the spring 43 is permitted to return the piston 21 to the right side of the cylinder 1. Inasmuch as the ratchet 28 is affixed to the plunger 7 it follows that the tooth 30 in question must ride over the now inclined pawl. As the reader can see in Fig. 10 it will be the inclined surface 45 that rides upon the upper edge of the pawl, the ultimate result being that the axially parallel surface 46 will take up a position on top of the pawl at a place about equally divided on each side of the pivot point 50, thereby causing the pawl to rise into the dotted line position in which position it remains until the next slack adjusting operation.

The result of the foregoing riding up of the tooth 30 on the inclined pawl is to cause a turn of the ratchet 28. This turn will be in the clockwise direction (arrow a, Fig 9), looking at the ratchet from the front. This clockwise turn is transmitted to the inner core section 36, the effect being to unscrew the section 36 from the section 33. After a number of slack adjusting operations the outer section 33 will be bound to have been unscrewed to a considerable extent as pictured in Figure 6. The pivot point 19 is thus made to "reach out", so to speak, the effect being to compensate for the wear on the brake shoes. It must be borne in mind that the rod 35 and section 33 are held from turning, the first by virtue of its connection at 19, the second by virtue of the engagement of the non-circular bore 34 with the non-circular rod. The unscrewing of the inner core section 36 therefore produces the extension of the core section 33 with the result previously stated.

It is noted principally that the action of the core sections of the plunger 7 for the purpose of making adjustments to take up slack in the braking connections occurs on the return or release stroke of the piston 21. In other words, by the action of the spring 43. The ratchet 28 and the co-operating pawl 48 are located on the outside of the brake cylinder, thus assuming places easily accessible for the purposes of inspection, repair, etc. In practice, it may be deemed advisable to provide suitable coverings for the parts mentioned so that dirt, water, etc. may be excluded, but the use of a protecting casing is optional. By virtue of the fact that the ratchet and its connections are located on the outside of the cylinder, it follows that the piston 21 is left entirely unobstructed. There is therefore nothing to prevent a full stroke of the piston (see Fig. 5) when the occasion demands. A full stroke may be required in the case of breakage of some of the connections, or of the breaking or falling off of one or both of the brake shoes.

The modification in Figure 11 illustrates an adaptation of the invention for use upon locomotives. In order to avoid a needless repetition of description all parts corresponding with the foregoing form have similar identifying reference characters. It is to be noted that the brake cylinder 1 now assumes a vertical position so that connection may be made with the locomotive brake system. For this purpose the exposed extremity of the outer core section 33 is threaded at 59 in order that a collar 60 may be screwed thereon. A pin 61 is inserted between the ears 62 of the collar, the pin extending through the bifurcated head 41 of the non-circular rod 35 previously described. The pawl 48 is pivotally carried by the bracket 49 as before, but the weight arm 502 is now extended out at right angles so that the pawl may be made to properly assume the inclined position when the ratchet 28 moves out beyond range of the pawl. The weight arm then engages the rest pin 55 suitably carried by the bracket.

While the construction and arrangement of the improved slack adjuster is that of a generally preferred form, obviously modifications and changes may be made without departing from the spirit of the invention or the scope of the claims.

I claim:—

1. An air brake system comprising brake shoes, articulated connections including a common pivot, a plunger joined at said common pivot, a piston to which the plunger is connected being movable in either of two opposite directions to perform application and release strokes; in combination an adjustable core forming part of the plunger, said core including an inner section connected to and rotatable with the plunger and having a threaded bore at its inner end, and an outer non-rotatable section slidable in respect to the plunger and having at its inner end a threaded stem occupying said bore, said outer section being connected with said pivot, and means associated with the plunger for turning the plunger upon said release strokes of the piston thereby to unscrew the outer core section and advance the common pivot for the purpose described.

2. An air brake system comprising brake shoes, articulated connections including a common pivot, a brake cylinder, a piston operable therein having a tubular plunger connected therewith for reciprocation and rotation and joined with said connections at the common pivot, said piston being movable in one direction by fluid pressure to produce an application of the brake shoes, a spring in the cylinder reacting against the piston moving it in the opposite direction to cause a release of the brake shoes; in combination, a sectional core forming part of the plunger comprising a rotatable inner section secured to the plunger for movement therewith and a non-rotatable outer section having threaded engagement with the inner section by which the plunger is joined with said connections, a pawl, a bracket mounted upon part of the cylinder pivotally carrying the pawl, a ratchet carried by said inner section engaging the pawl at successive ratchet teeth after certain application strokes of the piston to cause turning of the inner core section by reaction of the spring against the piston on the release stroke.

3. An air brake system comprising a brake cylinder, a piston operable in the cylinder, a plunger carried by and having rotary and rectilinear motion with the piston including a sleeve protruding from the cylinder and having a two-sectional core, one section being secured to and moving with the plunger sleeve and piston, the other extending therefrom for connection to the brake connections of the piston and having rectilinear motion only, a pawl carried by the brake cylinder, a ratchet carried by the protruding end of said plunger sleeve, means moving the piston in one direction to perform a brake-release stroke, said pawl catching a new tooth of the ratchet on certain release strokes of the piston thereby turning the sleeve connected core section and threaded means connecting the core sections causing rectilinear advancement of one core section in respect to the plunger for the purpose described.

4. Means for adjusting the slack in the rigging of air brake systems comprising a pressure cylinder, a piston therein, a tubular plunger connected thereto for reciprocation and rotation with said piston and with its outer end projecting beyond the cylinder, a sectional core forming part of said plunger including an inner section secured to and rotatable with the plunger and piston and a non-rotatable outer core section providing a rigging actuator and having threaded engagement with the inner core section and forming an extension of the plunger for connection to the brake rigging, means cooperating with the said projecting outer end of the tubular plunger and conditioned by brake applying movement of the plunger beyond a predetermined amount to impart rotatory movement to the plunger and piston upon the return or brake-releasing movement thereof, thereby through said threaded core sections causing longitudinal adjustment of the rigging actuator core in compensation for slack.

5. Means for adjusting the slack in the rigging of air brake systems comprising a pressure cylinder, a piston therein, a tubular plunger connected thereto for reciprocation and rotation with said piston and with its outer end projecting beyond the cylinder, a sectional core forming part of said plunger including an inner section secured to and rotatable with the plunger and piston and a non-rotatable outer core section providing a rigging actuator and having threaded engagement with the inner core section and forming an extension of the plunger for connection to the brake rigging, co-acting rotator members for the plunger and piston, one of which is mounted on the outer projecting end of the plunger and is provided with a surface which by engagement with the other rotator member normally holds it out of cooperative actuating position until a point in the brake applying movement of the plunger is reached representing the take up point and predetermined by the relation of the engaging surfaces of said rotator members, whereby said other rotator member is released and automatically moved to a position for cooperation with the plunger carried member on the return movement of the plunger to impart through said member rotative movement to the plunger thereby through said threaded connections, extending the rigging actuator longitudinally in compensation for slack.

6. Means for adjusting the slack in the rigging of air brake systems comprising a pressure cylinder, a piston therein, a tubular plunger connected therewith for reciprocation and rotation and having its free end extended beyond the cylinder, a non-rotatable rigging actuator forming an extension of said plunger and having threaded engagement therewith, a ratchet member mounted upon the extended end of the plunger for movement therewith, and an independently mounted pawl member normally resting thereon and held in inoperative relation thereto until the plunger has been moved in brake applying direction, the distance predetermined by the linear relation of the overlying pawl and ratchet surfaces whereupon said pawl will move and upon the return stroke of the piston rod be positioned to engage and impart rotative movement to the ratchet and plunger, thereby extending the rigging actuator longitudinally in compensation for slack.

WILLIAM S. DE CAMP.